Oct. 16, 1934.  A. E. CHURCH ET AL  1,977,572
POWER CONTROLLING APPARATUS
Filed Jan. 15, 1932  2 Sheets-Sheet 1
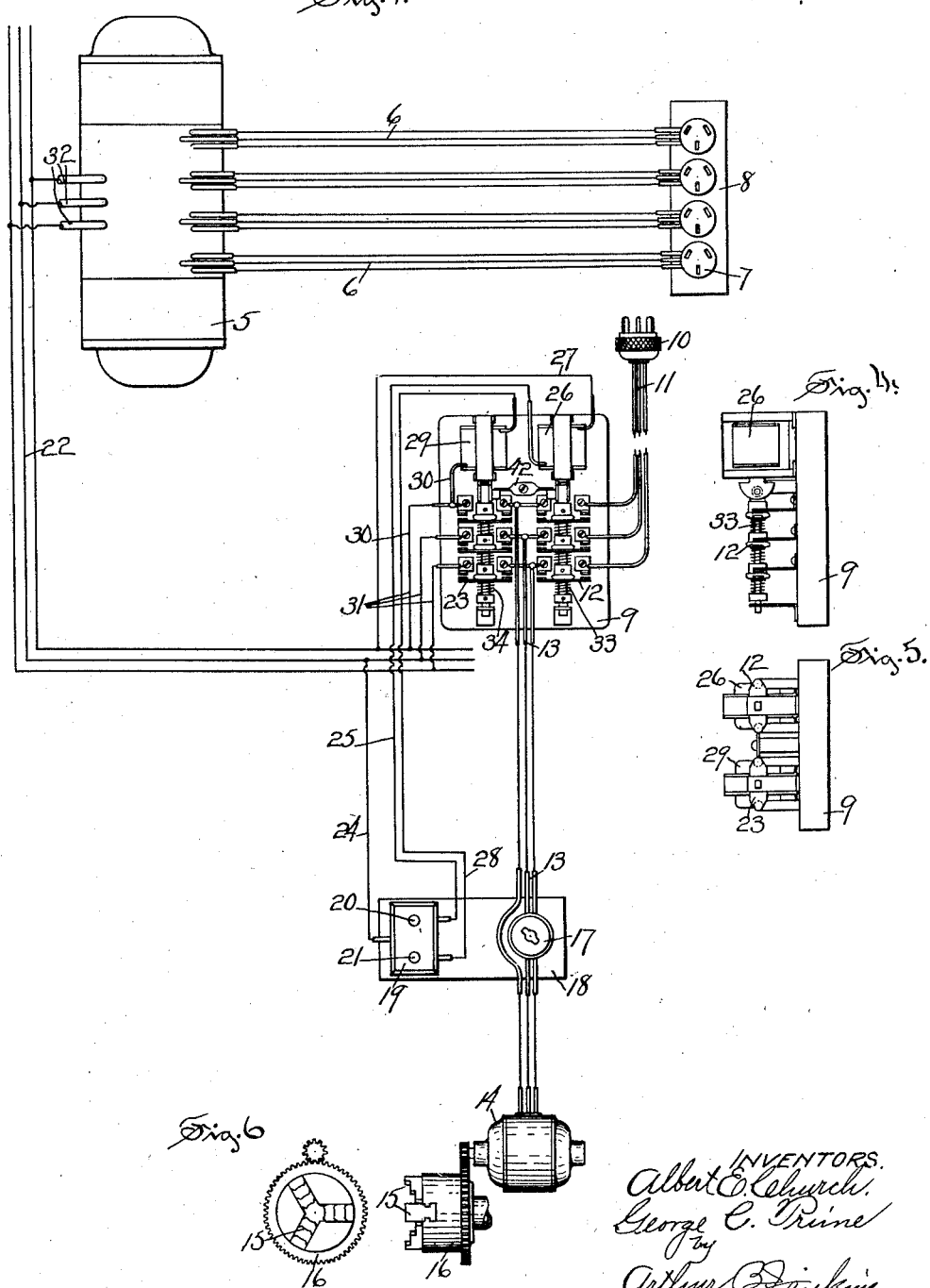

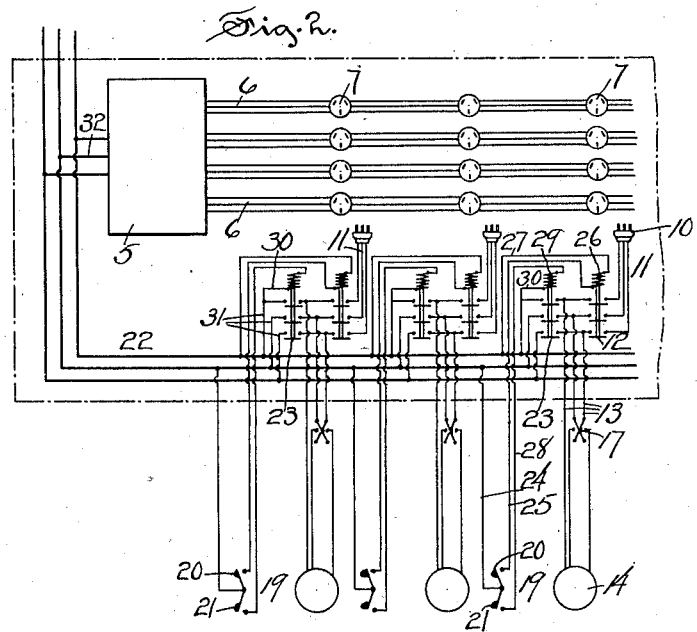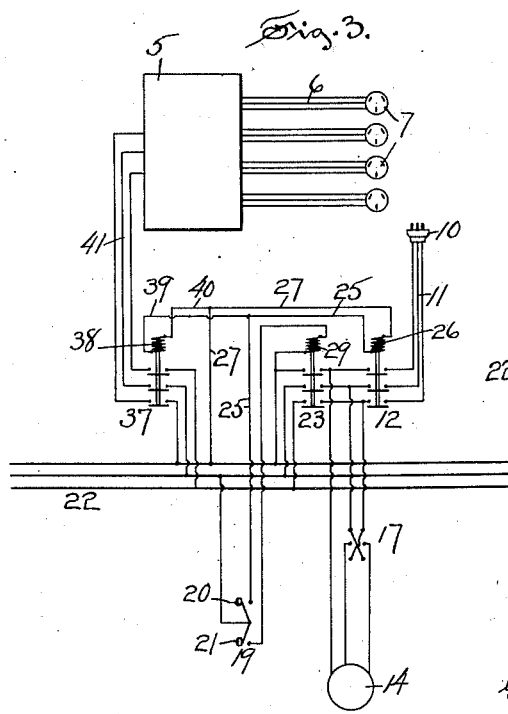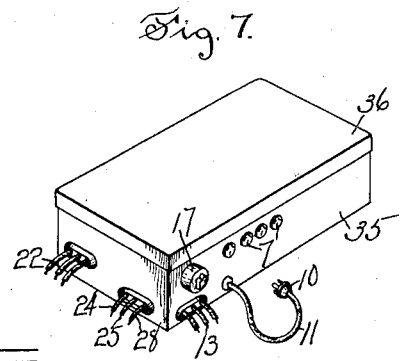

Patented Oct. 16, 1934

1,977,572

UNITED STATES PATENT OFFICE 1,977,572

POWER CONTROLLING APPARATUS

Albert E. Church, New Britain, and George C. Prime, Hartford, Conn., assignors to The Union Manufacturing Company, New Britain, Conn., a corporation of Connecticut Application January 15, 1932, Serial No. 586,864

8 Claims. (Cl. 172—179)

Our invention relates to apparatus for controlling the application of power to machinery of various sorts, and an object of our invention, among others, is the production of a simple and conveniently operated device by means of which power may be applied in varying degrees and to obtain different results in a particularly efficient manner.

Our improved power controlling apparatus in one of several different forms in which it may be embodied, and in the making and use of which the objects herein set out, as well as others, may be attained is illustrated in the accompanying drawings, in which—

Figure 1 is a semi-diagrammatic view illustrating the arrangement of our improved control box.

Figure 2 is a similar view illustrating an extended application of the box.

Figure 3 is a detail view illustrating a modified arrangement of the device.

Figure 4 is a side view of the gripping switch.

Figure 5 is an end view of the same.

Figure 6 is an end view of the chuck.

Figure 7 is a perspective view of the control box.

While our improved power controlling apparatus may be applied to machinery of different types, yet, as it is particularly adapted for use in connection with chucks for holding articles of various kinds for operation thereon of different sorts of tools, we have shown herein an arrangement that is particularly adapted for such purpose.

In the operation of lathe chucks, as an example, some articles to be operated upon will not require to be held as firmly by a chuck as other articles, and different degrees of force may therefore be employed and this will not only save power, but it will also avoid liability to injury of articles of a frailer nature. Then again, some articles are required to be gripped by movement of the chuck jaws in one direction and released by movement of said jaws in the opposite direction, while articles of another kind will require a reversal of such operations to grip and release such articles. When an article has been gripped or secured by the chuck jaws a certain degree of power is required for the purpose, but a greater amount of power will be required to loosen the jaws and release the article. All of these different conditions are provided for in a very simple and efficient manner in our improved control box described herein and illustrated in the accompanying drawings in which, however, only a portion of a machine to be operated by power controlled by the box, this being sufficient for a full and clear understanding of our invention in connection with the means for applying the power to such machine tools, is illustrated.

Our improved equipment includes a transformer 5 of any desired type and which may be located in any desired position with respect to machines to be operated therefrom and in the disclosure of our invention herein we have employed the well known three-wire system for conducting the electric current but without a detailed description as to its operation, as this will be readily understood by those skilled in the art. A transformer equipped to deliver different degrees of electromotive force is employed by us, four circuits 6 for this purpose being shown herein and extending to an equal number of sockets 7 placed upon a socket board 8. This board may be located in any desired position relatively to the transformer or a machine to be operated therefrom, but it will be preferably in proximity to a switch board 9 upon which two switches are mounted, each of these switches having three sets of contacts each of which sets operates to open and close a three-wire circuit in a manner that will be readily understood by those skilled in the art. A plug 10 adapted to fit either of the sockets 7 has the three wires of a plug circuit 11 attached thereto, each of these wires being secured to a plug circuit terminal on one side of a jaw gripping switch 12, this being one of the switches hereinbefore referred to and which operates in the mechanism herein shown to start operation of a motor to move chuck jaws to position to grip a piece of work.

The three wires of a motor circuit 13 are each secured to a motor circuit terminal on the opposite side of the switch from that just referred to. This circuit 13 is connected with a motor 14 which is of the reversible type and which operates, in the present instance, and as hereinbefore mentioned, the jaws 15 of a chuck 16, which jaws, in the type of chuck herein shown, are moved radially to grip and release pieces of work. The connection between the motor and the chuck is not specifically shown herein, but it may be of any of the well known types of chuck operating mechanism in use at the present time, it being sufficient to state that rotation of the motor in one direction operates the jaws to grip a piece of work and rotation in the opposite direction operates said jaws to release a piece of work.

It is here explained that the articles of one class of work are gripped on their outer surfaces by the jaws, the latter moving radially inward on the chuck body to grip the articles, and said jaws moving outwardly to release such articles, whereas in another class of work comprising hollow articles which are gripped on their inner surfaces, the operation of the jaws is reversed, that is, they are moved outwardly to grip the articles and inwardly to release the articles.

To permit this operation of the motor a polarity changing switch 17 is fixed to an operating board 18 which will preferably be placed upon the machine to which the power is to be applied, or contiguous thereto. When this switch is set in one position the electric current is supplied to the motor under certain conditions to be hereinafter described and the motor will be first driven in one direction to grip the work, and then reversed to release the work, and movement of the switch 17 to its other position and without change in the above mentioned conditions will first drive the motor in the opposite direction from that above described to grip the work, and then reversed to release the work, in the last mentioned operation the jaws 15 moving outwardly to grip the work and as described in the next preceding paragraph.

The conditions just referred to are effected by means of an operating switch 19 that is preferably placed on the machine being operated, and on the board 18 when that is attached to said machine. This operating switch comprises a gripping push button 20 or similar switch operating member and a releasing push button 21. This switch 19 controls current from a main circuit 22 to operate the jaw gripping switch hereinbefore referred to, and also a jaw releasing switch similar in construction to said jaw gripping switch. A wire 24 extends from the main circuit into the switch 19 and the button 20 connects said wire with a wire 25 extending to one terminal of a magnet 26 for operating the jaw gripping switch 12, a wire 27 extending from the opposite terminal of said magnet to the main circuit 22 and as shown in Figure 1 of the drawings. The button 21 connects the wire 24 with a wire 28 extending to one terminal of a magnet 29 for operating the jaw releasing switch 23 hereinbefore referred to, a wire 30 extending from the opposite terminal of said magnet to the main circuit 22 and as shown in Figure 1.

A releasing switch circuit 31, which also includes a part of wire 30, extends from the main circuit 22 to each of the terminals on one side of the switch 23, the terminals on the opposite side of said switch each being connected to a wire of the motor circuit 13.

The wires of the circuit 31 are so arranged relatively to the wires of the transformer and plug circuits 6 and 11 that when current is supplied to the motor by the circuit 31 said motor will be driven in the opposite direction from that in which it will be driven when supplied with current by the circuits 6 and 11. This arrangement will be readily understood by those skilled in the art without further explanation herein.

A set 32 of wires extends from the main circuit 22 to the transformer 5 for supply of current to the latter. The switch 19 is of that type now in common use wherein when one push button or similar device is operated to close the circuit the other button will be automatically moved in a direction to open the circuit. This prevents both of the buttons from being in circuit closing positions at the same time to operate simultaneously both of the switches 12 and 23 which would result in an over supply of electric current to the motor 14.

As hereinbefore noted some articles will not require so tight a grip by the chuck jaws as other articles and less force will therefore be required to operate the jaws. This is provided for by means of a plurality of sockets 7, as shown in Fig. 1, wherein four sockets appear. The connection of these sockets with the transformer through the transformer circuits 6 is such that each socket will receive a different degree of force than each of the others. As an example, the upper socket will be supplied with full force regulated by the transformer, the next socket with three-fourths of the full force, the next with one-half of the full force, and the bottom with one-fourth of the full force.

In the operation of the device, let it be assumed that articles to be held by the chuck jaws 15 are to be gripped on their outer surfaces, the chuck jaws moving radially inward for this purpose, and only one-half the force being required to hold the articles.

The plug 10 will be inserted in the socket next to the bottom socket in the row on the board 8, and the key of the switch 17 being in the position shown in Fig. 1 of the drawings will cause the motor 14, when power is applied thereto, to be rotated in a direction to move the jaws 15 radially inward to grip the articles in the chuck. The button 20 of the switch 19 now being operated by pushing it in the circuit is closed from the wire 24 through the wires 25 and 27, passing through the magnet 26, and the latter being energized the gripping switch 12 is operated to close the circuit from the transformer through the second socket from the bottom of the row on the board 8, the plug 10, the plug circuit 11, the switch 12, the motor circuit 13, the switch 17 to the motor whereafter the circuit or current will be disposed of in a manner that will be readily understood. This will operate the motor to effect a grip of an article by the jaws 15. When the intended pressure is obtained by the chuck jaws the motor will become stalled and the push button 20 being released, springs 33 of the switch 12 will act to open this switch. The chuck now being operated in the usual manner to effect an operation on the article held by the chuck jaws it becomes necessary to release the article and, as hereinbefore stated, more power will be required to do this than was required to secure the article. Therefore the whole power from the main line 22 is now obtained directly from that circuit which is greater than the power supplied by the transformer through the full pressure of the upper socket 7.

To do this the button 21 is now pushed in, closing the circuit through the wires 24, 28 and 30, through the magnet 29, thereby energizing said magnet to close the switch 23. This closes the circuit through wires 31, the switch 23, the circuit 13 and the switch 17 to the motor, and the wires are so arranged in a manner readily understood by those skilled in the art that the motor 14 is rotated in an opposite direction to that above described, thereby releasing the jaws 15 and loosening the work, whereupon pressure on the button 21 being released the springs 34 will open the switch 23, placing the parts in condition for repetition of the operation.

While, as hereinbefore stated, the transformer sockets and switches may be relatively arranged in any desired positions, yet, as a special convenience, we have devised a box, as shown in Fig. 7 which box 35 is provided with a cover 36 and houses the transformer, the jaw gripping and releasing switches 12 and 23, and the circuit 6. The sockets 7 are placed in a vertical row on the outside of the box and the switch 17 is located at the bottom of said row, as shown in Fig. 7. This box may be equipped with means for operating several machines, and as diagrammatically illustrated in Fig. 2 wherein a portion of the box is illustrated by dotted lines and three rows of sockets 7, each having a connecting system of plug circuits and switches as hereinbefore described, is shown.

The arrangement of the system shown in Fig. 3 is particularly adapted for operation of a single machine and the entire apparatus, including the transformer, is connected with the main circuit or line only when the machine is being operated. The general arrangement is the same as hereinbefore described, except that the transformer is connected with the main circuit by means of a switch which closes when the gripping circuit is closed. This transformer switch 37 is similar in construction and operation to that of the switches 12 and 23 hereinbefore described and includes a magnet 38 having one pole connected by a wire 39 with the wire 25 extending from the button 20 to one pole of the magnet for the gripping switch 12, the other pole of the magnet 38 being connected by a wire 40 with the wire 27 extending to the other pole of the gripping switch. A transformer supply circuit 41 extends from the switch 37 to the transformer wherein said circuit is connected as hereinbefore described.

In the operation of this device the push button 20 being operated to close the switch 12 the current is also directed by a wire 39 to and through the magnet 38 and through the wire 40 to the wire 27 and thence to the main circuit. This operates the switch 37, thereby closing the circuit to the transformer whereupon the operation of the device will be as hereinbefore described. This enables the transformer to be used only when actually required and eliminates core loss which would otherwise ensue with the transformer in continuous operation and economy in use is thereby promoted.

A guard 42 is pivotally mounted on the switchboard 9 to prevent the switches 12 and 23 from being simultaneously closed, which event would result in a short circuit across the line. When one switch is closed it strikes one end of the guard, swinging it on its pivot and forcing the other end down, thereby preventing the other switch from being closed.

We claim—

1. A power controlling apparatus including a motor, a polarity changing switch for said motor, disconnected and independently operating switches to control supply of different degrees of force of electric current to said polarity changing switch, means for supplying one of said switches with different degrees of force, and a single switch to control operation of said controlling switch.

2. A power controlling apparatus including a motor, a polarity changing switch for said motor, a pair of disconnected and independently operating switches to control supply of different degrees of force of electric current to said polarity changing switch, means for supplying one of said switches with different degrees of force, and a switch operating in one position to control operation of said controlling switch to rotate the motor in one direction and in another position to effect rotation of said motor in an opposite direction without change of said polarity changing switch.

3. A power controlling apparatus including a motor, a motor circuit leading to said motor, two switches each connected on one side with said motor circuit, a high power and a constantly lower power circuit connected one to the opposite side of each of said switches, means between said switches and motor for reversing the direction of initial rotation of said motor and means for independently operating each of said switches to introduce current to said motor circuit from either of the other circuits.

4. A power controlling apparatus including a motor, a motor circuit leading to said motor, two switches each connected on one side with said motor circuit, independent circuits connected one to the opposite side of each of said switches, means for constantly introducing a more forceful current to one than to the other of said last mentioned circuits, means between said switches and motor for reversing the direction of initial rotation of said motor and means for independently operating each of said switches to introduce current to said motor circuit from either of said two circuits.

5. A power controlling apparatus including a motor, a motor circuit leading to said motor, two switches each connected on one side to said motor circuit, a transformer circuit connected with the opposite side of one of said switches, a transformer for controlling supply to said transformer circuit, a circuit of constantly higher power connected to the opposite side of the other of said switches, means between said switches and motor for reversing the direction of initial rotation of said motor and means for independently operating each of said switches to introduce current to said motor circuit from either of the other circuits.

6. A power controlling apparatus including a motor, a motor circuit including a polarity changing switch connected with said motor, two disconnected and independently operating switches each connected on one side with said motor circuit, a transformer circuit including a transformer connected with the opposite side of one of said switches, a circuit of constantly higher force connected with the opposite side of the other of said switches, and an operating switch connected to independently control the operation of both of said two switches for introduction of current to the motor circuit from either of the other circuits.

7. A power controlling apparatus including a motor, a motor circuit including a polarity changing switch connected with said motor, two disconnected and independently operating switches each connected on one side with said motor circuit, a transformer circuit including a transformer connected with a main circuit and with the opposite side of one of said switches, an electrical connection between said main circuit and the opposite side of the other of said switches to supply a constantly higher power thereto, a magnet operatively connected with each of said switches, and an operating switch connected with each of said magnets for independent operation thereof.

8. A power controlling apparatus including a motor, a motor circuit including a polarity changing switch connected with said motor, two disconnected and independently operating switches each connected on one side with said motor circuit, a plug circuit connected with the opposite side of one of said switches, a main circuit connected with the opposite side of the other of said switches to supply a constantly higher power thereto, a plug connected to said plug circuit, a plurality of sockets adapted to receive said plug, a transformer connected to said sockets for supply of different degrees of force thereto, a magnet operatively connected with each of said switches, and an operating switch connected with each of said magnets for independent operation thereof.

ALBERT E. CHURCH.
GEORGE C. PRIME.